United States Patent [19]

Kashiwagi et al.

[11] Patent Number: 5,126,540
[45] Date of Patent: Jun. 30, 1992

[54] IMAGE RECORDING APPARATUS FOR SELECTIVE RECORDING OF ORIGINALS

[75] Inventors: Kazuo Kashiwagi, Tokyo; Masahiko Ito; Hirokazu Higuchi, both of Yokohama, all of Japan

[73] Assignee: Canon Kabushiki Kaisha, Tokyo, Japan

[21] Appl. No.: 523,564

[22] Filed: May 15, 1990

[30] Foreign Application Priority Data

| May 15, 1989 | [JP] | Japan | 1-121193 |
| May 15, 1989 | [JP] | Japan | 1-121194 |
| May 15, 1989 | [JP] | Japan | 1-121195 |
| May 15, 1989 | [JP] | Japan | 1-121199 |

[51] Int. Cl.⁵ .............................. G06F 15/20
[52] U.S. Cl. .......................... 235/375; 235/437; 235/449; 235/454; 355/40
[58] Field of Search ........... 235/375, 437, 449, 454; 354/76, 107, 109; 355/40, 64; 382/57

[56] References Cited

U.S. PATENT DOCUMENTS

| 3,560,718 | 2/1971 | Spanjersberg | 235/437 |
| 4,068,212 | 1/1978 | Templeton | 382/57 |
| 4,283,621 | 8/1981 | Pembroke . | |
| 4,577,956 | 3/1986 | Klosterhuber et al. . | |
| 4,722,444 | 2/1988 | Murphy | 235/437 |
| 4,819,034 | 4/1989 | Weinzierl et al. . | |

*Primary Examiner*—Harold Pitts
*Attorney, Agent, or Firm*—Fitzpatrick, Cella, Harper & Scinto

[57] ABSTRACT

An image recording apparatus provided with a reader for reading information for identifying the original image; a recorder for recording the original on a recording medium; a transporting unit for transporting the original to the reader and the recorder unit; a detector for detecting the presence or absence of the identifying information on the original; and a controller for selecting whether or not to record the original according to the outputs of the detector and the reader.

25 Claims, 17 Drawing Sheets

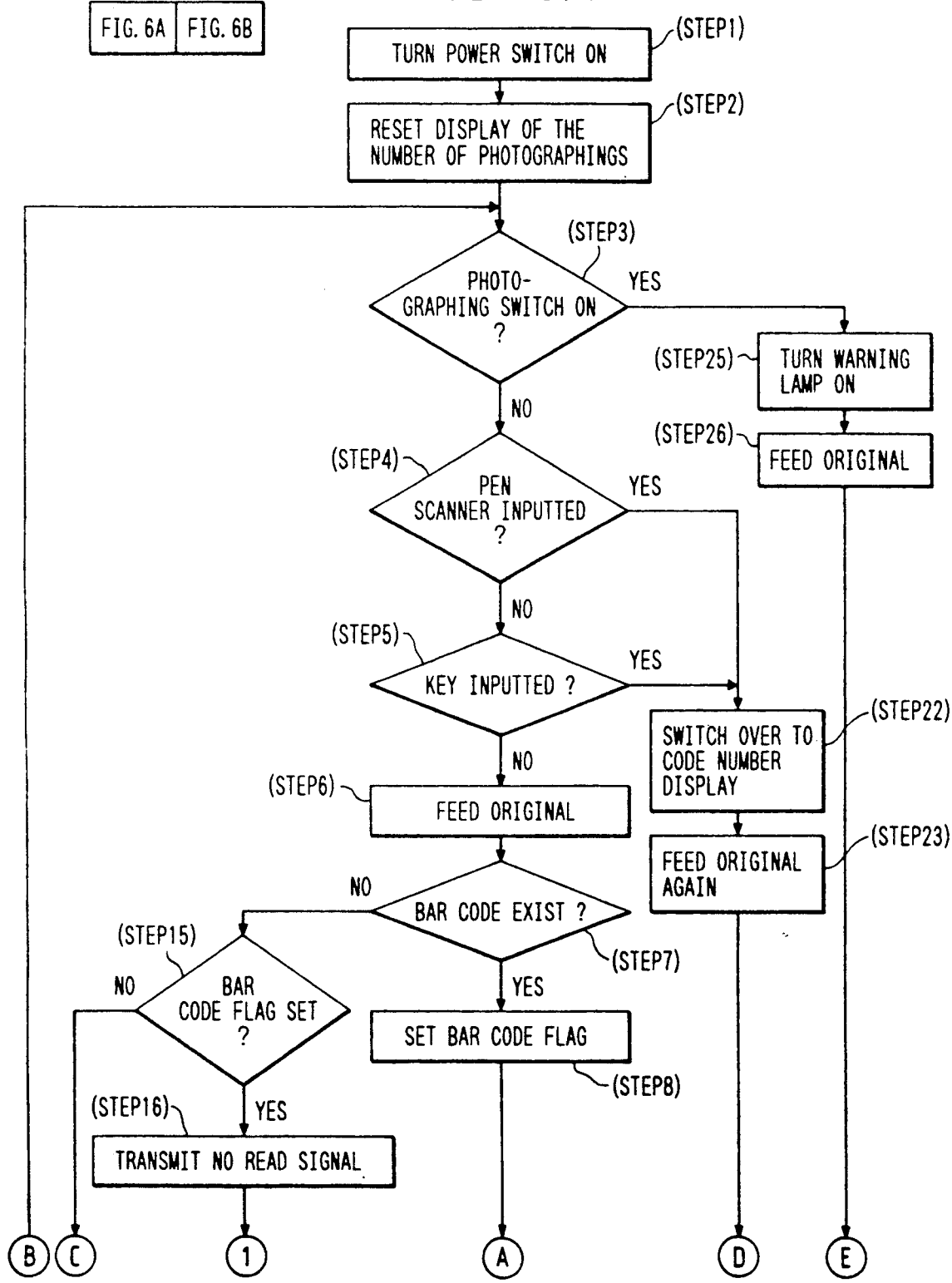

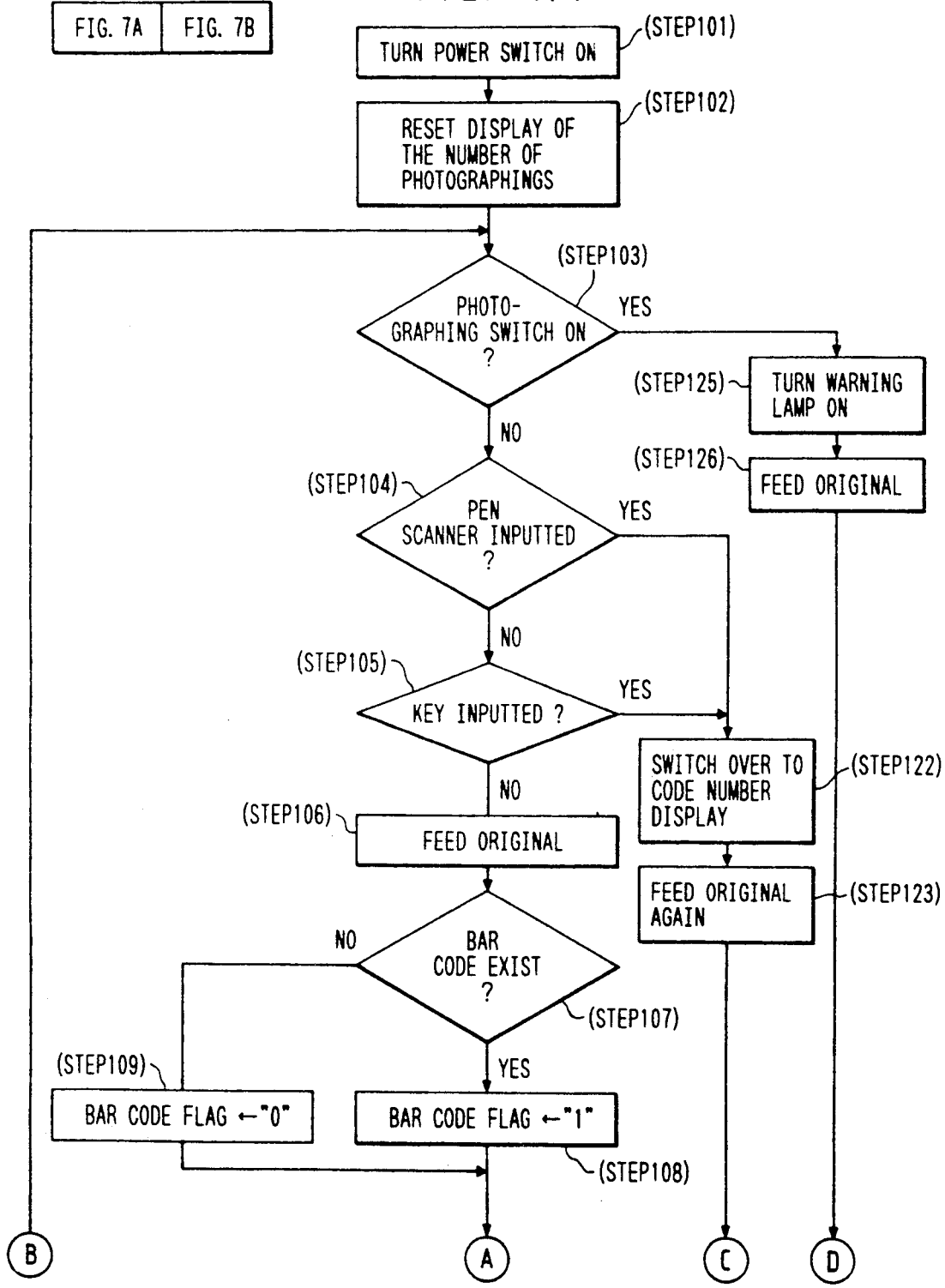

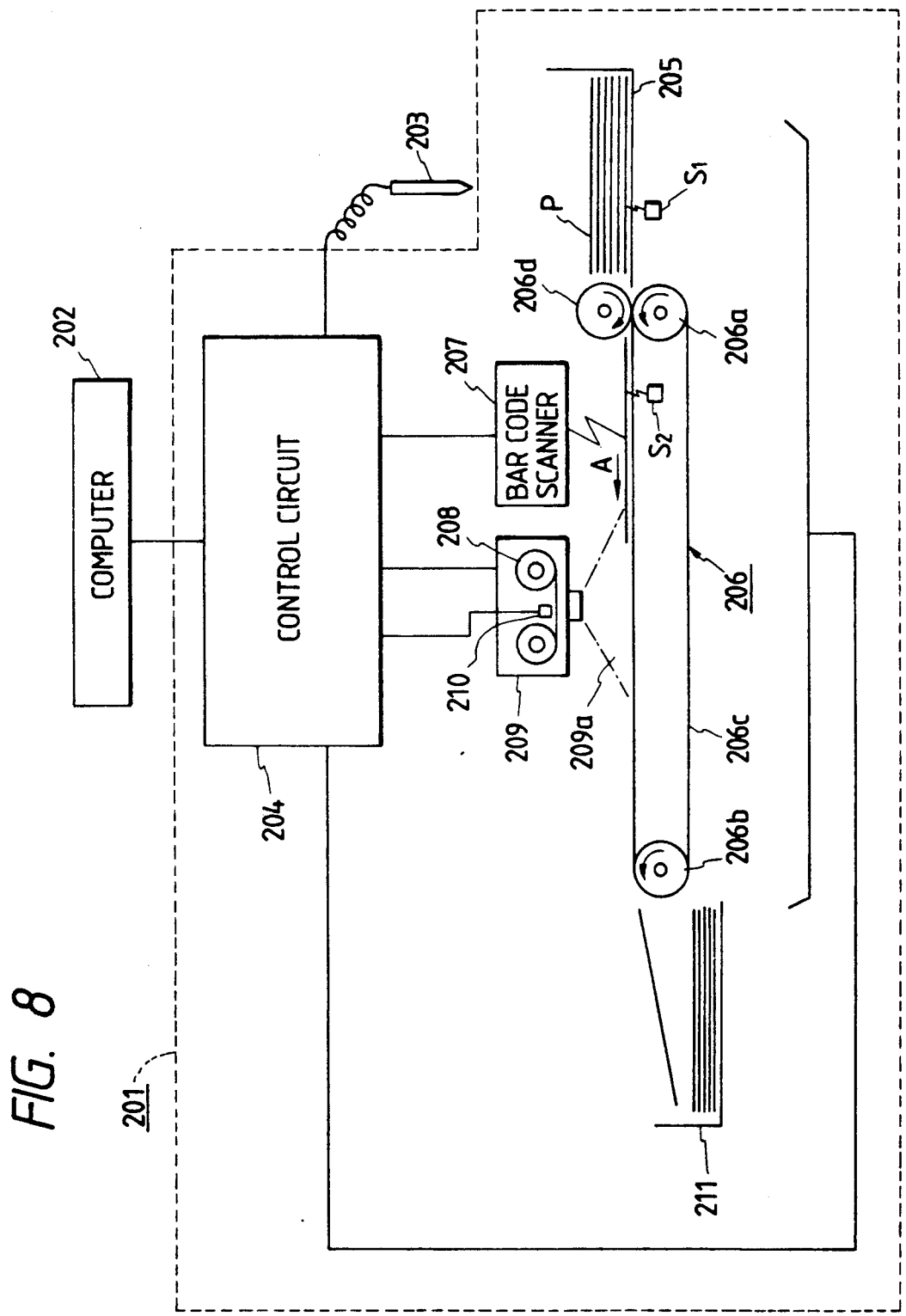

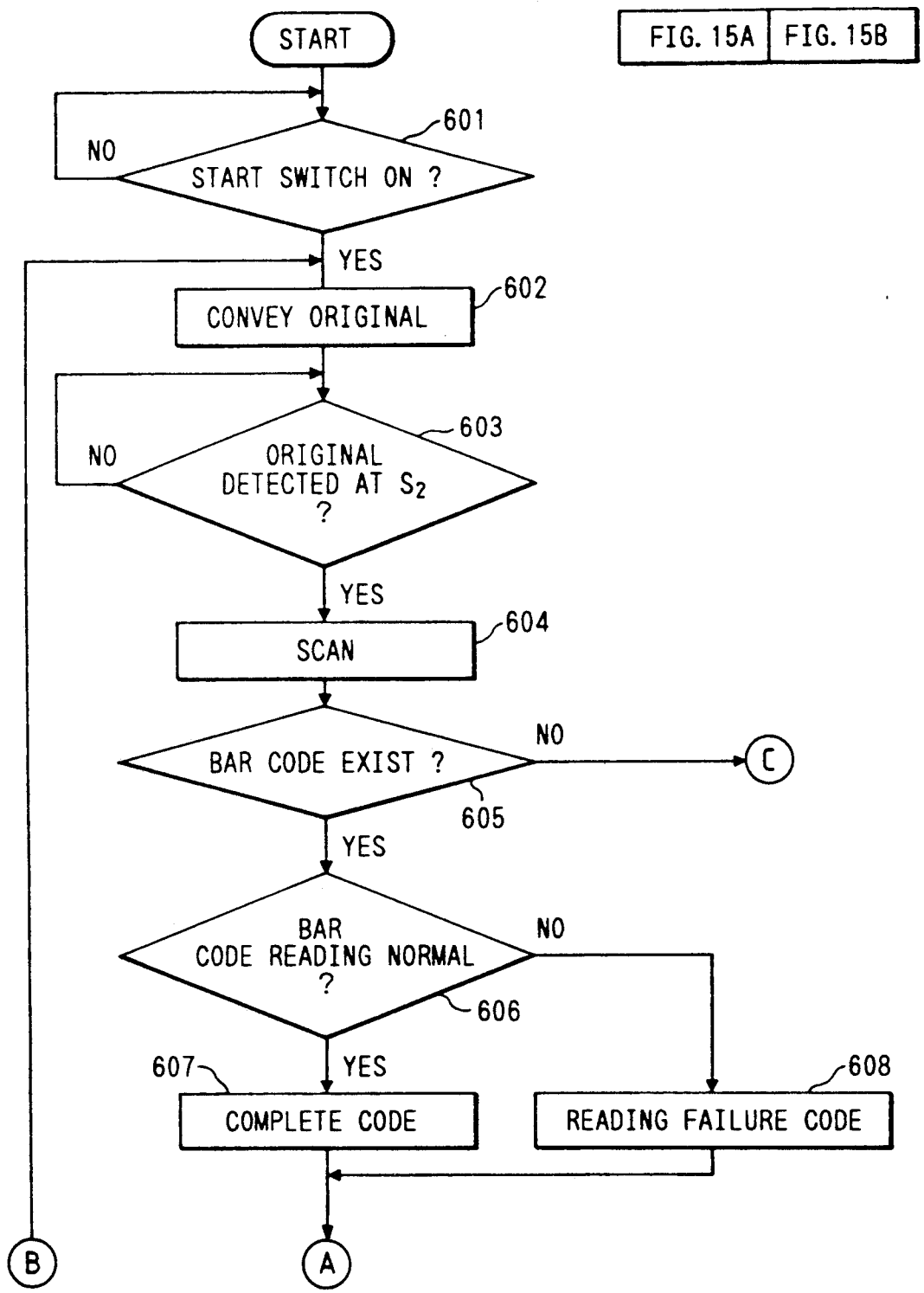

IMAGE RECORDING APPARATUS FOR SELECTIVE RECORDING OF ORIGINALS

BACKGROUND OF THE INVENTION

1. Field of the Invention

The present invention relates to an image recording apparatus for recording, on a recording medium, an original image bearing information for identifying the original, such as a bar code.

2. Related Background Art

In order to reduce the storage space for originals generated in bulk, for example those of business forms, there has been conducted recording of images of originals on microfilms, optical or magnetic disks. However, in order to enable easy access or retrieval to these images afterwards, there have to be prepared index data corresponding to each image, and the entry of such index data has required an enormously long time. As a method for solving such a problem, there is already known an apparatus for reading code information attached on the original as index data by mechanical means such as bar code scanner, a magnetic ink character reader or an optical character reader, and recording the original image on a recording medium.

In said apparatus, the originals to be recorded, on which code information for indentifying the originals are attached in advance, are supplied into a transport path in succession, and said code information are read automatically by reading means provided in said transport path. The information thus read is accumulated, as index data, in a memory unit of external equipment such as a computer.

On the other hand, the originals after the reading of code information are supplied in succession into a photographing unit, and the original images are recorded on a microfilm. The address (frame) numbers of the images recorded on the microfilm are read as index data and accumulated in said memory unit, together with the code information.

However, in such conventional apparatus, the index data become absent in case of a reading error resulting for example from smear or damage in the code information on the original or from skewed advancement of the original, and the index data for the photographed image with such failed data reading have to be manually entered into the computer afterwards.

For this reason it has been conceived to separate the originals with proper bar code reading and those with failed bar code reading (hereinafter called failed reading documents), and to forcedly discharge such failed reading documents on a tray different from a tray on which the properly read originals are discharged.

On the other hand, the photographing unit is provided with mark recording means for recording a mark close to the image recorded on the microfilm, thereby optically recording, as shown in FIGS. 19A and 19B, a mark 111 at the side of each image frame 110 for the purpose of counting the image frames 110 of the microfilm 109 at retrieval. For example, a frame number (n−1, y) indicates a y-th page in an (n−1)-th set, a frame number (N,1) indicates a 1st page in an n-th set, and a frame number (n+1, 1) indicates a 1st page in an (n+1)-th set.

The above-mentioned mark 111 is recorded is plural sizes for grouping the image frames 110. More specifically, in order to facilitate grouping, the size of the mark 111 corresponding to the frame numbers (n, 1), (n+1, 1) etc. representing the 1st page in each set is varied.

Such change in the mark size is conducted either manually by the operator by interrupting the feeding of the original documents, or automatically when the number of photographed original documents reaches a predetermined value.

The read bar code data A is supplied to the computer and stored in the memory, and the frame numbers B representing the image frames of the microfilm are stored in the memory in the sequential order corresponding to said bar code data A, thereby enabling easy and secure retrieval.

However, the conventional structure with manual change of mark size not only requires considerable manpower but is very inefficient because the image recording operation is interrupted for each change of mark size. On the other hand, the conventional structure with automatic change of mark size according to the number of photographed images also requires manpower for the setting of the number of photographed images in advance, and is associated with an increased cost due to the complexity of the apparatus.

Also, in certain original documents, for example personal records containing plural pages for each individual as shown in FIG. 20, the bar codes A, B representing personal name appear only in the first pages $100_1$, $100_4$ in the personal packets $100_1$-$100_3$, $100_4$-$100_5$, while other pages $100_2$-$100_3$, $100_5$ only show other data such as occupation records, personal history, personal qualifications etc.

When such original documents are to be recorded in the conventional apparatus explained above, they have to be stored in advance by the personal names, and the change of the mark size has to be made at the first page of each personal packet.

It is therefore conceivable to insert a partition sheet between the packets and to automatically change the mark size upon detection of said partition sheet, but it is still necessary, also in such case, to manually insert such partition sheets into the original documents in advance.

Also, if such original documents are recorded in the above-explained apparatus capable of separating and discharging the failed reading originals, the documents $100_2$, $100_3$, $100_5$ lacking the bar code are always identified as the failed reading originals. Since a large number of original documents are identified as such failed reading originals in this case the manual entry of index data for such originals becomes cumbersome and inefficient.

On the other hand, in an apparatus which records data indicating the failed reading without the separation of the failed reading originals, such data are also recorded for the original document lacking the code information, or for the erroneously turned-over originals in addition to the actual failed reading. Consequently there will be required an enormous amount of correction of index data.

Particularly in case where the original document is erroneously turned over, the recorded image appears totally blank (or black). It is therefore very difficult to locate the original image for the purpose of re-recording, from the recorded image.

SUMMARY OF THE INVENTION

An object of the present invention is to provide an image recording apparatus capable of properly processing the originals with or without information for identification.

Another object of the present invention is to provide an image recording apparatus capable of controlling the feeding of original documents, recording of image and index data, according to the presence or absence of identifying information.

Still another object of the present invention is to provide an image recording apparatus enabling precise and efficient input operation.

The foregoing objects can be attained, according to the present invention, by an image recording apparatus provided with reading means for reading the identification information of the original document, detecting means for detecting the presence or absence of the identification information, recording means for recording the original image on a recording medium, and control means for selecting whether or not to record the original image according to the outputs of said reading means and detecting means.

BRIEF DESCRIPTION OF THE DRAWINGS

FIG. 8 is a schematic view of another embodiment of the image recording apparatus;

DESCRIPTION OF THE PREFERRED EMBODIMENTS

Figure 1:
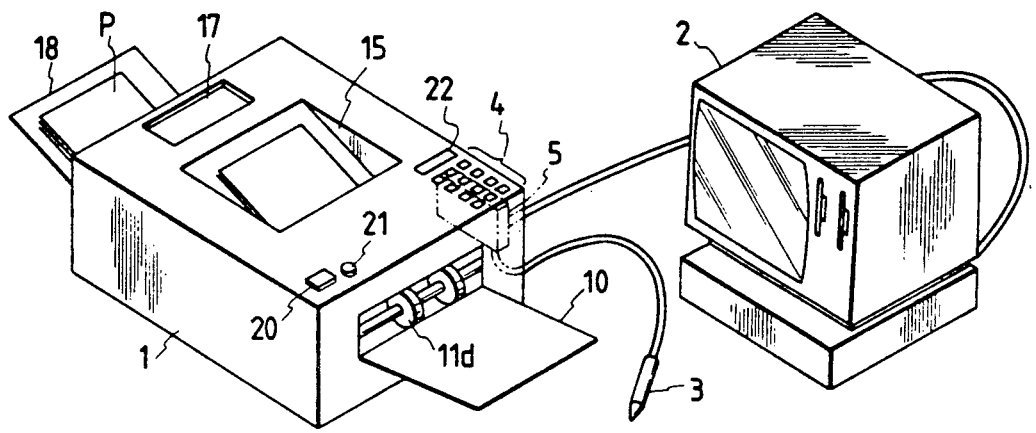
FIG. 1 is a perspective external view of an image recording apparatus constituting an embodiment of the present invention.
Figure 2:
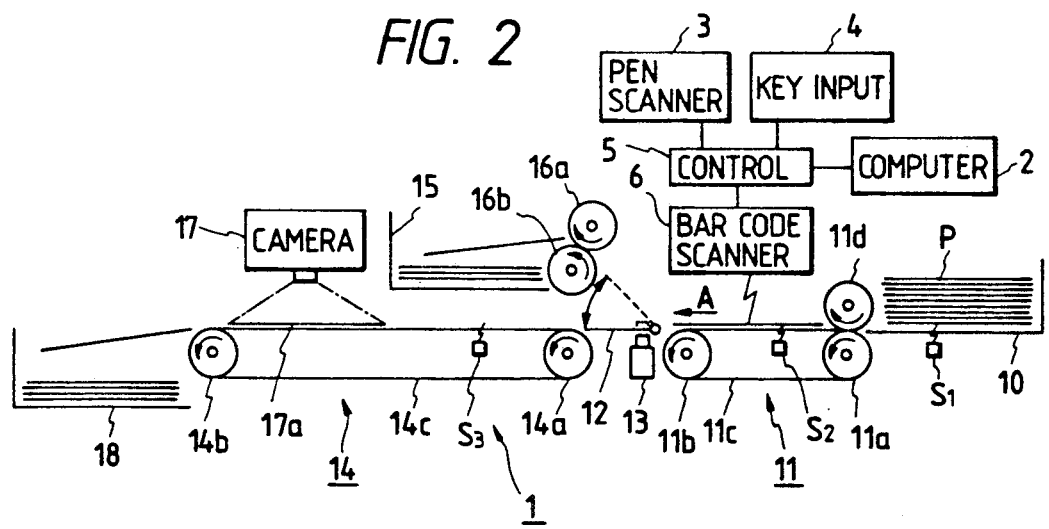
FIG. 2 is a schematic vertical cross-sectional view of a photographing unit of said embodiment.

FIGS. 1 to 6 illustrate an embodiment of the present invention, the structure of which will be explained in the following with reference to FIGS. 1 and 2.

The apparatus of the present embodiment is composed of a photographing unit 1 for recording the images of originals P; a computer 2 for controlling said photographing unit 1 and serving as an information processing unit for processing and storing index data; a pen scanner 3 serving as first input means for entering the index data; and a key input 4 serving as second input means for entering index data.

All the information entered by said input means are supplied to a control circuit 5 in the photographing unit 1, then to the computer 2 and stored in the memory thereof. In front of the photographing unit 1, there is provided a sheet feeding tray 10 for stacking originals P such as business forms, and a sensor $S_1$, for detecting the presence or absence of the originals P is provided thereunder, Next to the tray 10, there is provided transporting means 11, composed of a belt 11c provided between rollers 11a, 11b and a roller 11d maintained in contact with said belt 11c at the position of the roller 11a, for transporting the originals P one by one from the bottom, in a direction A. Above said transporting means 11 there is provided a bar code scanner 6 as reading means for reading the bar code attached on the original P, and a sensor $S_2$ for detecting the presence or absence of the original P on the belt 11c is provided between the rollers 11a and 11b. At the downsteam side in the tranporting direction of the transporting means 11, there is provided a guide plate 12 vertically rotatable by a rejecting solenoid 13, for sorting the originals P to above or below. By shifting said guide plate 12 between a solid-lined position or a broken-lined position, the original P transported in the direction A is guided to transport means 14 provided at an approximately same level as that of the transport means 11, or to a reject tray 15 provided above said transport means 14.

Said transport means 14 is composed of a pair of rollers 14a, 14b and a belt 14c provided there-between. Between said rollers 14a, 14b there is provided a sensor $S_3$, which detects the presence or absence of the original P on the belt 14c and also functions as a switch for controlling the transfer of information from the control circuit 5 to the computer 2 when the original P passes on the belt 14c.

Between the reject tray 15 and the guide plate 12 there are provided rollers 16a, 16b for advancing the original P into said tray. Above the transport means 14 and next to the reject tray 15, there is provided a replaceable camera 17 constituting recording means for photographing the original P, at a photographing position 17a on the belt 14c, on a microfilm (not shown).

In the downstream side in the transporting direction or the transport means 14, there is provided a sheet tray 18 for stacking the originals P after photographing.

On the upper face of the photographing unit 1 there are provided, as shown in FIG. 1, a photographing switch 20 for controlling photographing only of the original P, a warning lamp 21 indicating an on-state of said switch 20, and a display unit 22 for indicating the number of photographing or code number of the original P.

Figure 3A:
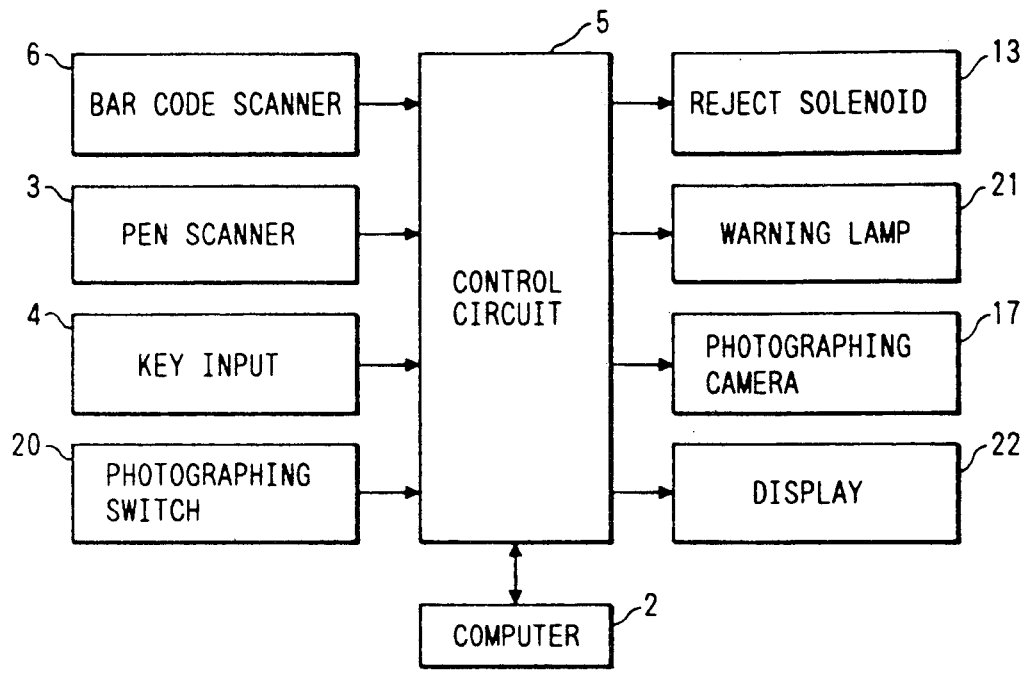
FIGS. 3A and 3B are block diagrams of principal control systems of said embodiment.

The structure of the present embodiment will be explained in the following, with reference to block diagrams shown in FIGS. 3A and 3B.

The bar code scanner 6, key input unit 4, photographing switch 20, reject solenoid 13, warning lamp 21, camera 17 and display unit 22 of the photographing unit 1 are connected to the control circuit 5, to which is also connected the pen scanner 3.

The control circuit 5 is connected to the computer 2, whereby the information supplied to said control circuit 5 is transferred to the computer 2.

Figure 3B:
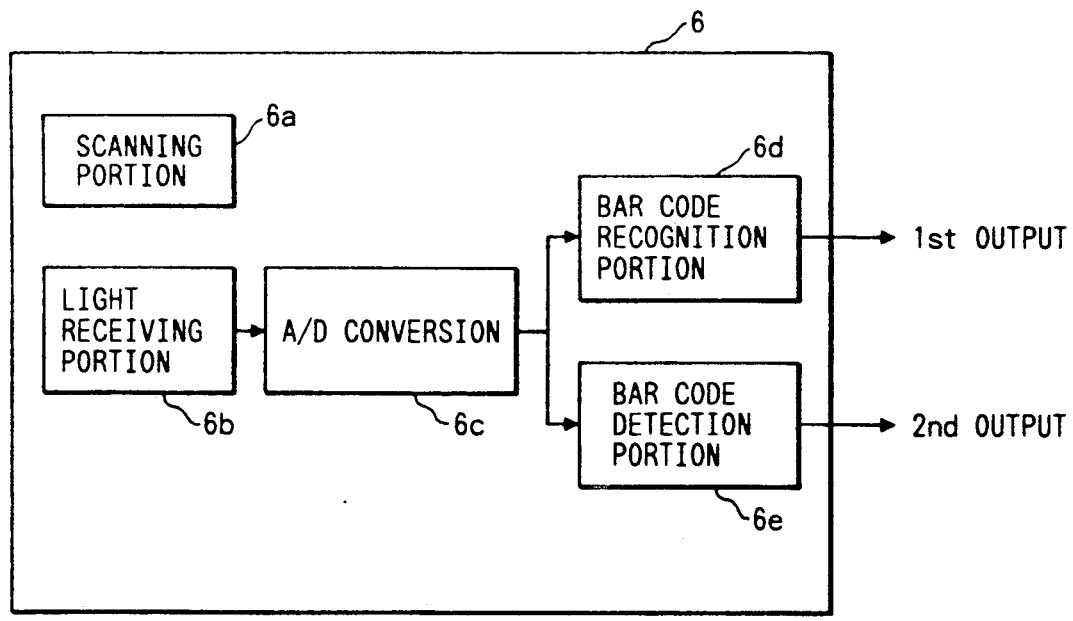

The above-mentioned bar code scanner 6 is composed, as shown in FIG. 3B, of a scanning unit 6a for generating a light beam for scanning the bar code of the original P; a light receiving unit 6b for receiving the light reflected by the bar code; an A/D converter 6c for converting the analog signal obtained from said received light into a digital signal; a bar code recognition unit 6d for recognizing a bar code from the thus converted digital signal; and a bar code detection unit 6e for detecting the presence or absence of a bar code. Said bar code recognition unit 6d releases, from a first output, either a code signal (first signal) corresponding to a bar code in case said bar code is properly read or a no-reading signal (second signal) in case a bar code cannot be properly read. Also the bar code detection unit 6e releases, from a second output, either a code presence signal of high level or a code absence signal of low level, respectively, when the presence or absence of the bar code is detected. The bar code detection by said bar code detection unit 6e is conducted in the following manner.

Figure 4:
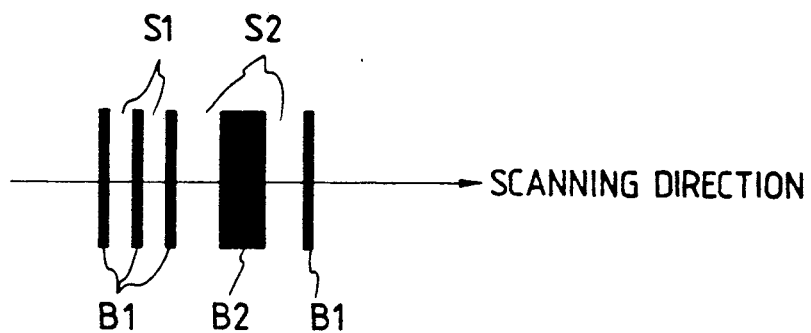
FIG. 4 is a view of a bar code.

It is assumed that original P bears a bar code as shown in FIG. 4, consisting of fine black bars B1, a thick black bar B2, fine white spaces S1 and thick white spaces S2. Upon reading of said bar code, it is assumed that B1 provides a bit train "111", B2 provides "111111", S1 provides "000" and S2 provides "000000". Thus the bar code shown in FIG. 4 provides a bit train:

111000111000111000000111111000000111 (1).

By converting each bit corresponding to S2 (6 bits in this case) after the bits "1" thus obtained to "1", there is obtained a bit train:

111111111111111111111111111111111111 (2).

Thus bits "1" are obtained over the entire bar code area.

Figure 5:
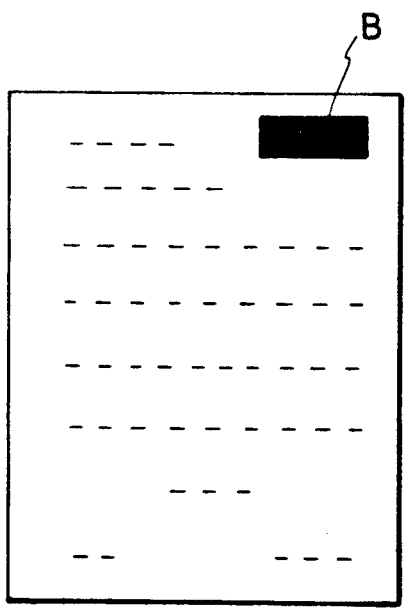
FIG. 5 is a schematic plan view showing the principle of bar code detection.

The above-explained operation is conducted not only for a line but for the entire area of the original P, and said original P is identified to have a bar code in case a black area B of a predetermined area or large area as shown in FIG. 5, is obtained. The bar code detection is conducted as explained above.

As an alternative, it is also possible, in the above-explained bit train (1), to change "1" to "0" and to put bits "1" corresponding to S2 (6 bits) after each bit shift from "1" to "0" thereby obtaining:

000111111111111111111000000111111000 (3)

and to obtain:

111111111111111111111111111111111111 (4).

same as (2) above, by taking OR of the bit trains (1) and (3).

On the other hand, in ordinary characters, the above-explained process seldom provides a black area of the predetermined size, and erroneous identification can be avoided because a white space is always present between the lines of characters. Consequently the presence or absence of a bar code can be securely detected.

Figure 6B:
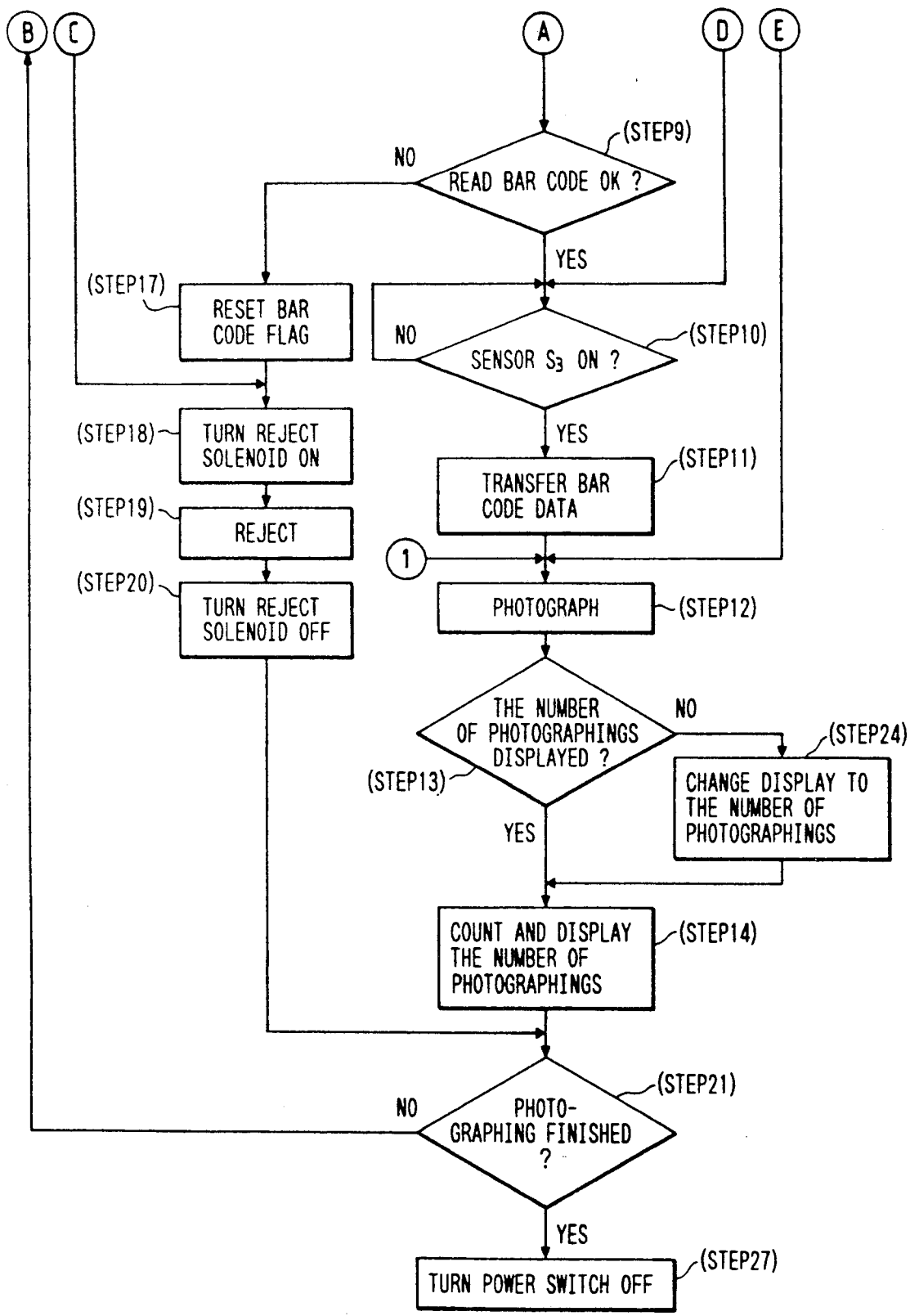
FIG. 6 is a flow chart of the control sequence of said embodiment.

In the following there will be explained the function of the present embodiment, with reference to a flow chart shown in FIG. 6.

In photographing an original P bearing a bar code, the operator turns on a power switch (step 1), and resets the display of number of photographed frames of the display unit 22 (step 2).

If the photographing switch 20 is not actuated, nor the input operation with the pen scanner 3 or the key input unit 4 is conducted, there are automatically conducted the feeding of the original P (steps 3, 4, 5, 6), and the detection of the bar code by the bar code detecting unit 6e (step 7).

Upon detection of a bar code, a bar code presence signal is supplied to the control circuit 5 which sets a bar code flag (step 8), and causes the bar code recognition unit 6d to read said bar code (step 9). After proper reading of the bar code, the original P is transported in the direction A, shown in FIG. 2, by the transport means 11, 14 and guide plate 12. Then, the sensor S2 is turned on upon detection of the original P on the belt 14c, whereupon the bar code data is transferred from the control circuit 5 to the computer 2 (step 10, 11). Said code data are stored in the memory or the computer 2. Subsequently the original P is photographed on the microfilm by the camera 17 (step 12), and an increased number of photographed frames is displayed on the display unit 22 (steps 13, 14). Said number is supplied to said memory as the address number of said original P on the microfilm, and is stored therein, corresponding to said bar code data. The address number thus stored corresponding to the bar code data constitutes the index data. On the other hand, in case the bar code cannot be read in the step 9, the control circuit 5 resets the bar code flag (step 17), then energizes the rejecting solenoid 13 (step 18) to rotate the guide plate 12 thereby guiding the original P to the reject tray 14 (step 19), and then turns off the reject solenoid 13 (step 20) thereby returning the guide plate 12 to the original position.

On the other hand, if the step 7 identifies the absence of a bar code, the bar code detection unit 6e sends a code absence signal to the control circuit 5, which then discriminates whether the bar code flag has been set (step 15). If said flag is set (for example, second or succeeding page of a series of originals P having the bar code only on the first page, as shown in FIG. 8), the control circuit 5 sends a no-reading signal to the computer 2 (step 16), thereby conducting the photographing and the display of frame number by the steps 12, 13 and 14. On the other hand, if the flag is not set, the above-explained steps 18, 19 and 20 are executed to reject the original P.

In the case of photographing the rejected original P, the photographing switch 20 is not actuated, but the index data of the rejected original are entered by the pen scanner 3 or the key input unit 4 into the control 5 (step 4, 5), whereby the display unit 22 is switched to the display of code information, enabling the confirmation of the input data (step 22). Then the original P is fed again, and the above-explained steps 10, 11, 12 and 13 are executed without the reading by the bar code scanner 6. Since the display unit 22 is in a mode for displaying the code number in the step 13, it is switched to a mode of photographed frame display (step 24), and the above-explained step 14 is executed. The entry of the index data of the rejected original P can be made either by the pen scanner 3 or the key input unit 4, depending on the state of said original P.

In case the photographing operation alone is conducted without the preparation of the index data, the steps 1 and 2 are followed by the actuation of the photographing switch 20 (step 3), whereupon the warning lamp 21 is turned on (step 25). Thereafter the original P is automatically fed (step 26), and subsequently the photographing and the display of the number of photographed frames are conducted in the steps 12, 13 and 14 explained above. The warning lamp 21 is turned on after the actuation of the photographing switch 20 in order to warn the operator, because, if the original P is transported with said switch on, the photographing operation is conducted without the index data even when the bar code is present.

After the number of photographed frames is displayed on the display unit 22 (step 14), if the photographing operations are completed (step 21), the function is terminated by the turning off of the power switch (step 27). If not, the sequence is repeated from the step 3 explained above.

In the above-explained embodiment there are employed a bar code and a microfilm camera, but the present invention is not limited to such an embodiment. For example, the original identifying information may be provided by another code readable with MICR or OCR. Also, the recording means is not limited to the structure employing a microfilm, but can be means for recording the image of the original on an optical disk or a magnetic tape through an image sensor such as a CCD, or an electrophotographic recording means.

Also, the presence or absence of the code information can naturally be conducted according to the form of said code information, for example by the presence of a character in a predetermined area in case the reading means is composed of an OCR, or by the magnetic component in the characters in case the reading means is composed of an MICR.

As explained in the foregoing, the present invention allows determination of whether or not to read the identifying information, according to whether said identifying information is present on the original. Therefore, for example in case a series of originals have the identifying information only on the first page, such as in the personal record, it is rendered possible to distinguish the originals lacking the identifying information from those of failed information reading, thereby avoiding unnecessary manual input and improving the efficiency of input operation.

Figure 7B:
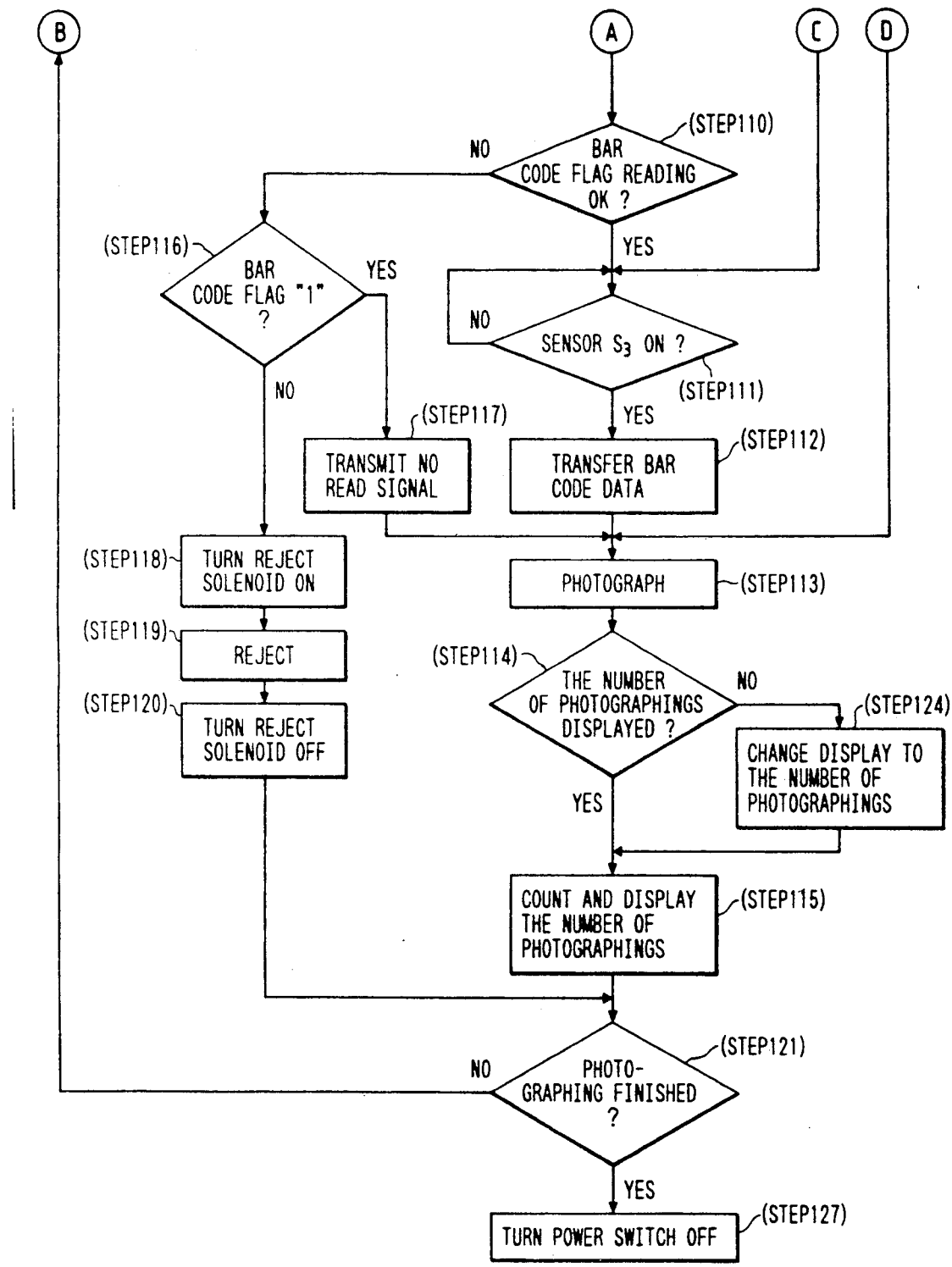
FIG. 7 is a flow chart of the control sequence of another embodiment.

FIG. 7 is a flow chart of the control sequence of another embodiment of the present invention, in which the original recording and the original transportation are controlled according to the discrimination by the bar code recognition unit and the bar code detection unit.

In photographing an original P bearing a bar code, the operator turns on the power switch (step 101), and resets the display of the number of photographed frames on the display unit 22 (step 102).

If the photographing switch 20 is not actuated, nor the input operation with the pen scanner 3 or the key input unit 4 is conducted, there are automatically conducted the feeding of the original P (steps 103, 104, 105, 106), and the detection of bar code by the bar code detection unit 6e (step 107). Upon identification of presence of the bar code, the bar code detection unit 6e sends a bar code presence signal to the control circuit 5, thereby setting a bar code flag "1" (step 108). In case of the identification of absence of the bar code, a bar code absence signal is supplied to the control circuit 5 to set a bar code flag "0" (step 109).

Then the bar code is read with the bar code recognition unit 6d (step 110). After proper reading, the original P is transported in the direction A, shown in FIG. 2, by the transport means 11, 14 and guide plate 12. Then the sensor S2 is turned on upon detection of the original P on the belt 14 c, whereupon the bar code data are transferred from the control circuit 5 to the computer 2 (steps 111, 112). Subsequently the original P is photographed on the microfilm by the camera 17 (step 113), and an increased number of photographed frames is displayed on the display unit 22 (steps 114, 115).

Figure 20:
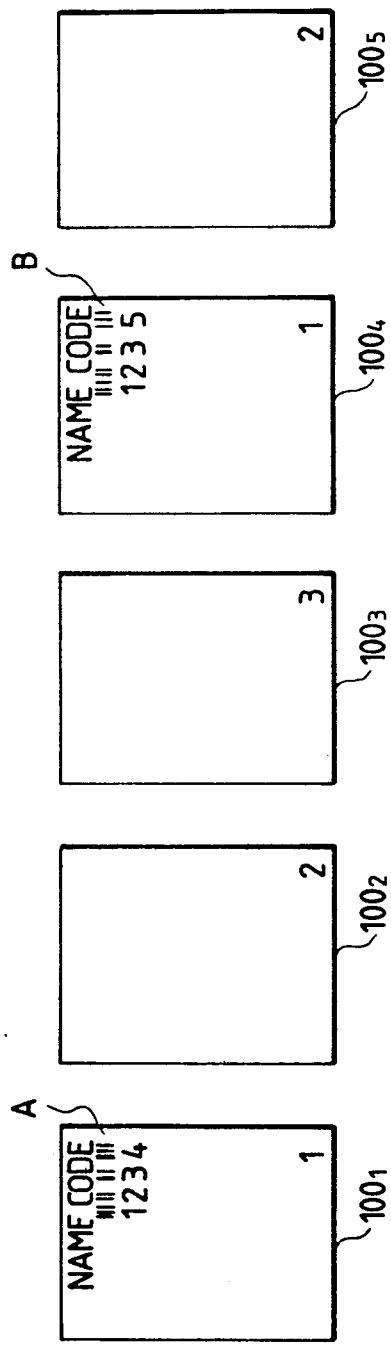
FIG. 20 is a view showing an example of images to be recorded.
Figure 19A:
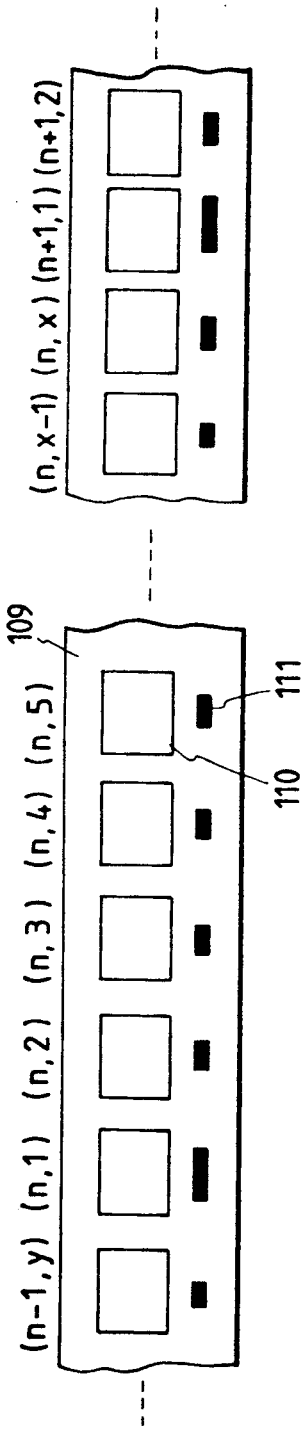
FIGS. 19A and 19B are schematic views showing the relation between image frames and index data on a microfilm.
Figure 19B:
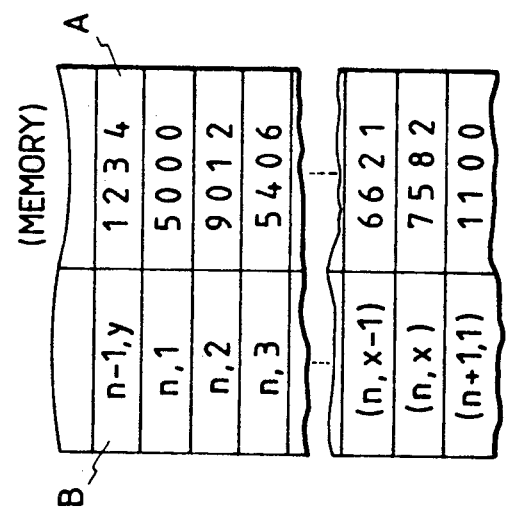

If the bar code cannot be read in the step 109, there is discriminated whether the bar code flag is "1" or "0" (step 116). If it is "1" (for example, case of second or ensuing page in a series of originals P having the bar code only on the first page, as shown in FIG. 20), it is identified that the main index data are already transferred and the original P is a second or ensuing page related to said main index data on the first page. Thus a no-reading signal (for example a one-byte control code different from the numerals or alphabets) is sent to the computer 2 through the control circuit 5 (step 117), and there are conducted the photographing and the display of the number of photographed frames by the above-explained steps 113, 114 and 115.

On the other hand, if said bar code flag is "0", the reading is identified as improper due, for example, to smear on the bar code, and the reject solenoid 13 is energized (step 118) to rotate the guide plate 12 thereby guiding the original P to the reject tray 15 (step 119). Subsequently the reject solenoid 13 is deactivated (step 120) to return the guide plate 12 to the original position.

In case of photographing the rejected original P, predetermined index data are entered into the control circuit 5 through the pen scanner 3 or the key input unit 4 without the actuation of the photographing switch 20 (steps 104, 105), whereby the display unit 22 is switched to the mode of displaying the code information thereby enabling the confirmation of the input data (step 122). Then the original P is fed again (step 123), and the steps 111, 112, 113 and 114 are executed without the reading with the bar code scanner. Since the display unit 22 is in a mode for displaying the code number in the step 114, it is switched to a mode of displaying the number of photographed frames (step 124), and the above-explained step 115 is executed. The entry of the index data of the rejected original P can be made either by the pen scanner 3 or the key input unit 4, depending on the state of said original P.

In case the photographing operation alone is conducted without the preparation of the index data, the steps 101, 102 are followed by the actuation of the photographing switch 20 (step 103), whereupon the warning lamp 21 is turned on (step 125). Thereafter the original P is automatically fed (step 126), and subsequently the photographing and the display of the number of photographed frames are conducted in the steps 113, 114 and 115. The warning lamp 21 is turned on after the actuation of the photographing switch 20 in order to warn the operator, because, if the original P is transported with said switch on, the photographing operation is conducted without the index data even when the bar code is present.

After the number pf photograped frames is displayed on the display unit 22 (step 115), if the photographing operations are completed (step 121), the function is terminated by the turning off of the power switch (step 127), If not, the sequence is repeated from the step 103 explained above.

The above-explained embodiment enables secured recording of the original lacking the code information, without forced rejection, thereby enabling exact input operation without unnecessary manual input, thus reducing the processing time and improving the efficiency of the input operation.

Figure 9:
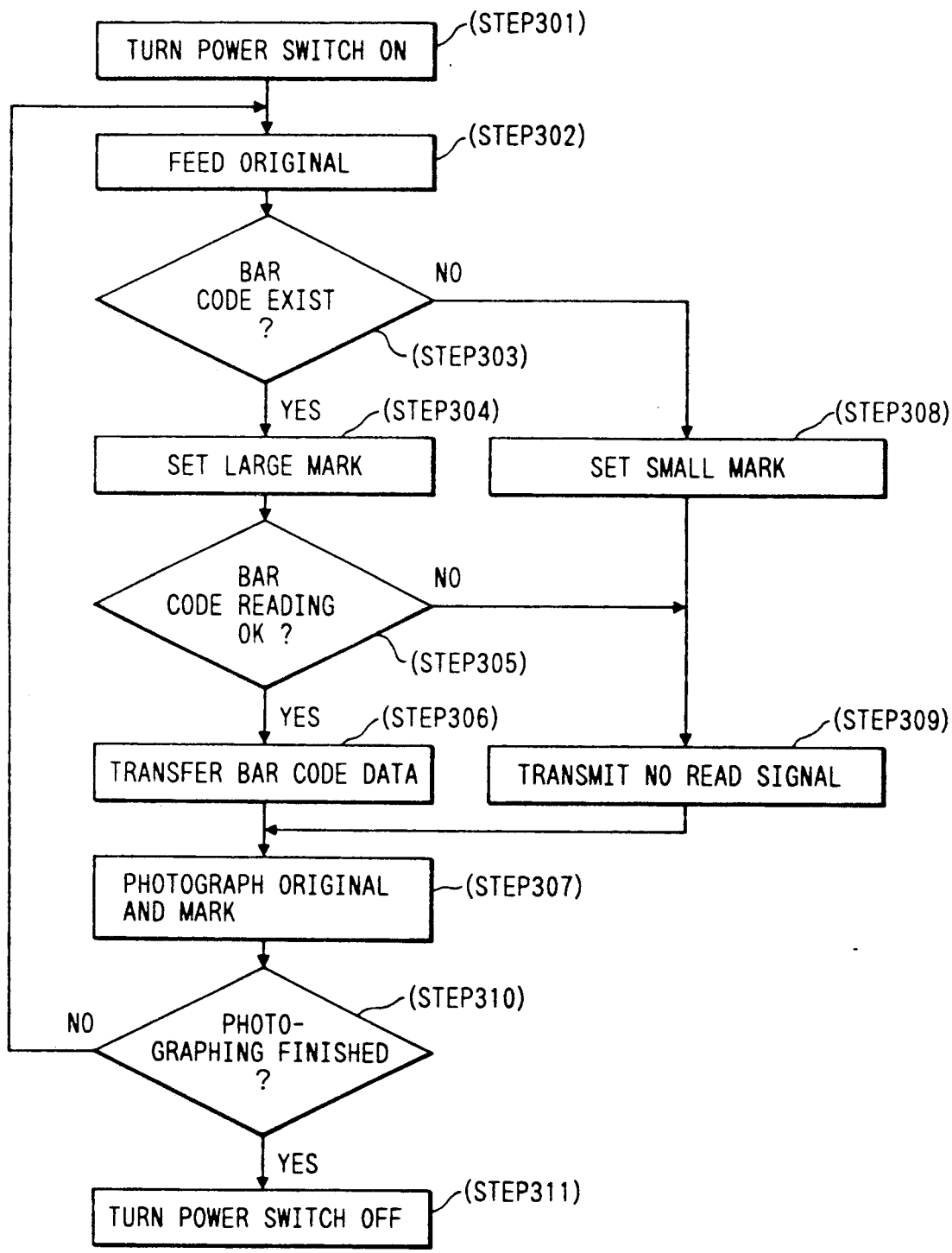
FIG. 9 is a flow chart of the control sequence of the embodiment shown in FIG. 8.
Figure 10:
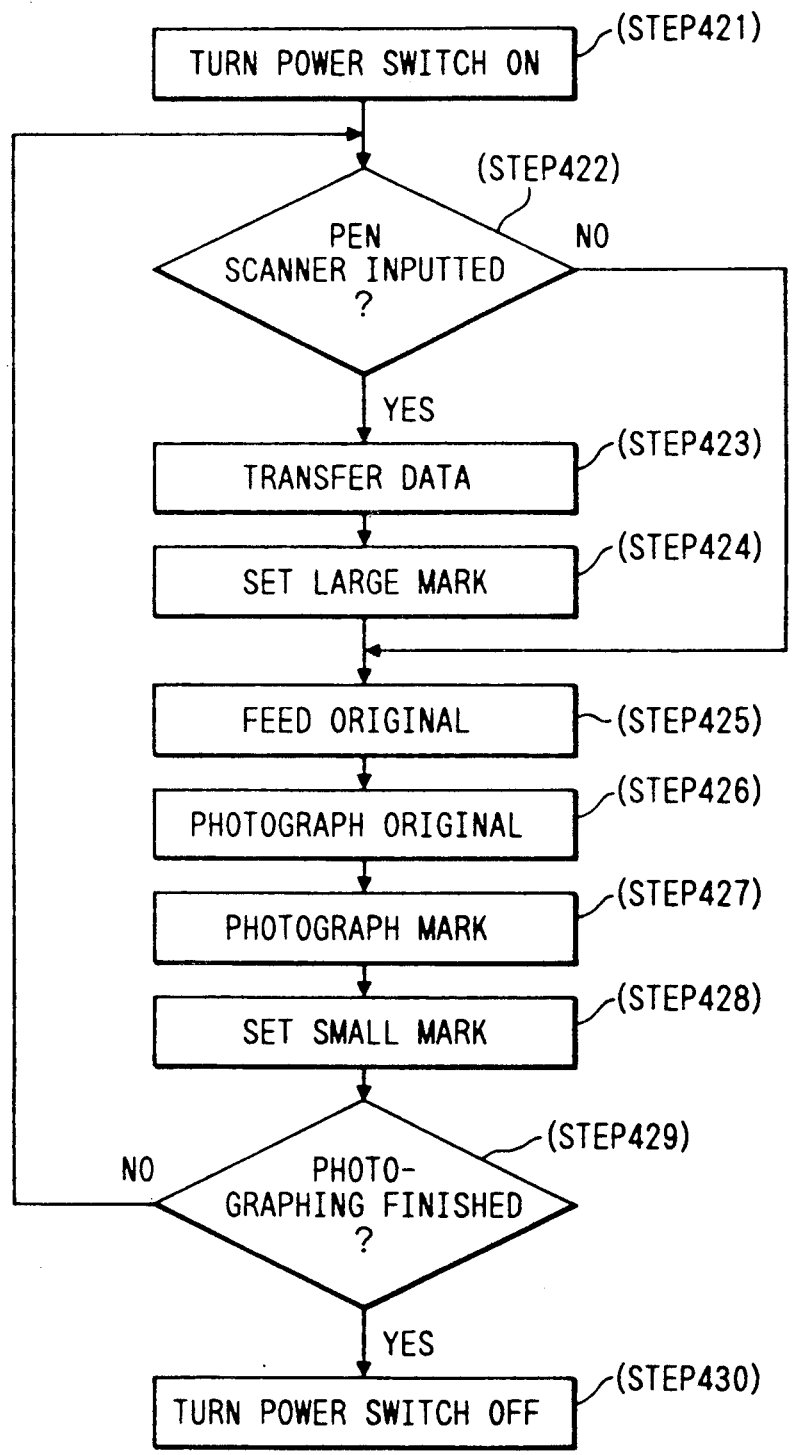
FIG. 10 is a flow chart of the control sequence of still another embodiment.

FIGS. 8 to 10 illustrates still another embodiment of the present invention, the structure of which will be explained in the following with reference to FIG. 8.

The apparatus of the present embodiment is composed of a photographing unit 201 for recording the images of original documents P; a computer 202 for controlling said photographing unit 201 and serving as an information processing unit for processing and storing index data; and a pen scanner 203 for entering the index data.

All the information entered by the input means is supplied to a control circuit 204 in the photographing unit 201, then to the computer 202 and stored in the memory thereof. In front of the photographing unit 201, there is provided a feeding tray 205 for stacking original documents P such as business forms, and a sensor S1 for detecting the presence or absence of the original documents P is provided thereunder.

Next to the tray 205, there is provided transporting means 206, composed of a belt 206c provided between rollers 206a, 206b and a roller 206d maintained in contact with said belt 206c at the position of the roller 206a, for transporting the original documents P one by one from the bottom in a direction A. Above said transporting means 206 there is provided a bar code scanner 207 as reading means for reading the bar code attached on the original document P, and a sensor S2 for detecting the presence or absence of the original document P on the belt 206c is provided between the rollers 206a, 206b.

Above the belt 206c there is provided a replaceable camera 209 constituting recording means for photographing the original P, at a photographing position 209a, on a microfilm 208.

In said camera 209, there is provided mark recording means 210 for selectively recording marks of different sizes on the microfilm 208. The bar code scanner 207, camera 209 and mark recording means 210 of the photographing unit 201 are connected to the control circuit 204, to which is also connected the pen scanner 203.

The control circuit 204 is connected to the computer 202, whereby the information supplied to said control circuit 204 is transferred to said computer 202.

In the downstream side in the transporting direction of the transporting means 206, there is provided a sheet tray 211 for stacking the originals P after photographing.

In the following there will be explained the function of the present embodiment, with reference to a flow chart shown in FIG. 9.

In photographing originals P bearing bar codes, the operator turns on a power switch (step 301), and sets the originals P on the tray 205, whereupon the sensor S1 detects the originals P and the originals P are fed in automatic manner (step 302).

When as original P is detected by the sensor S2, the bar code detection unit 6e detects the presence or absence of the bar code (step 303). If the presence of the bar code is identified, the bar code detection unit 6e sends a code presence signal to the control circuit 204, thereby selecting a large mark to be recorded by the mark recording means 210 (step 304).

Then the bar code is read by the bar code recognition unit 6d (step 305), and, after proper code reading, the bar code data are transferred from the control circuit 204 to the computer 202 (step 306). Subsequently the original P is photographed, in the camera 209, onto the microfilm 208, on which also recorded is a large or small mark according to the previous setting (step 307).

On the other hand, if the step 303 identifies the absence of the bar code, a code absence signal is supplied to the control circuit 204, thereby selecting a small mark to be recorded by the mark recording means 210 (step 308).

Thus, as in the case of failure of bar code reading in the step 305, a no-reading signal (for example a one-byte control code different from numerals or alphabets) is sent through the control circuit 204 to the computer 202 (step 309), and there is executed the above-explained step 307 for photographing and recording of the mark.

After said photographing and mark recording (step 307), if the photographing operations are completed (step 310), all the functions are terminated by the turning off of the power switch (step 311). If not, the above-explained sequence is repeated from the step 302.

On the microfilm 208 thus recorded, the originals bearing the bar code but not properly read for example because of the smear of the bar code are recorded with large marks, so that the input of bar code data for such originals with failed data reading can be achieved by re-entering the data for the frames with no-reading signals. In this manner it is rendered possible to simplify the entry of the bar code data and to improve the efficiency by automatic change of the mark size.

In the following there will be explained another embodiment of the present invention, in which the structure is the same as that shown in FIG. 9, but the entry of the bar code is executed with the pen scanner 203 instead of the bar code scanner 207. Consequently the same components as those in the foregoing embodiment are represented by the same numbers, and the functions will be explained with reference to a flow chart shown in FIG. 10.

In photographing an original P bearing a bar code, the operator turns on the power switch (step 421), and enters the bar code of the original P by the pen scanner 203 (step 422), the entered bar code data are transferred to the computeer 202 (step 423), and the mark to be recorded by the mark recording means 210 is shifted from the small mark initially selected to the large mark (step 424). When the original P is set on the tray 205, it is detected by the sensor S1 and is automatically fed (step 425).

Then, when the object P is detected by the sensor S2, it is photopraphed by the camera 209 onto the microfilm 208 (step 426), and the large mark selected above is recorded thereon (step 427). After the recording of a frame, the control circuit 204 changes the mark to be recorded by the mark recording means 210 to the small mark (step 428). Thereafter the sequence starting from the step 422 is repeated with the small mark until the sensor S1 no longer detects the original P (step 429).

If the photographing operations are completed, the power switch is turned off (step 430) to terminate all the functions.

Thus, the present embodiment can improve the efficiency of operation, since the large mark is recorded only for the pages involving the data input with the pen scanner 203, and small mark is automatically recorded for other pages.

As explained in the foregoing, the present embodiment is capable of varying the mark size automatically by simply feeding the originals to be recorded, without any cumbersome operations such as the presetting of a number, thereby eliminating unnecessary manual input operation.

Thus, the recording operation can be efficiently conducted as the change of mark size can be made without the interruption in the recording operation.

Also since the reading means serves also for setting the control information for mark size change, the cost can be reduced without complication in the structure of the apparatus.

Figure 11:
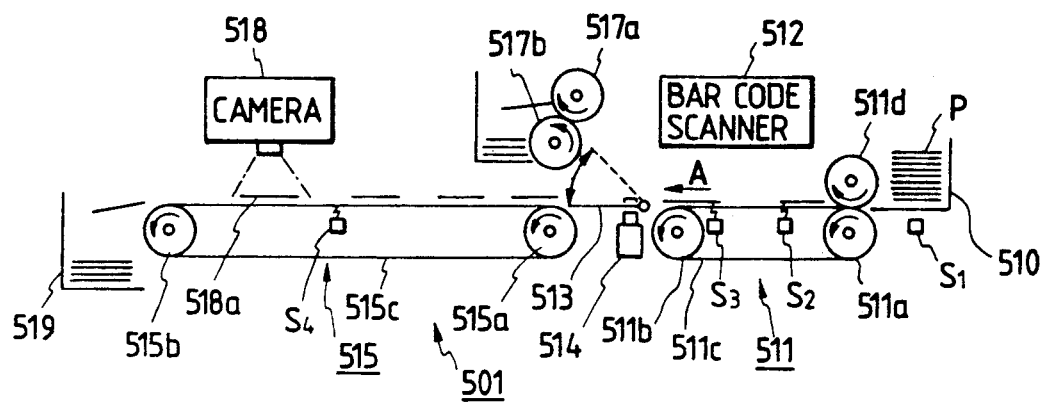
FIGS. 11 and 12 are respectively a schematic view and a perspective external view of another embodiment of the image recording apparatus.

FIG. 11 shows another embodiment of the image recording apparatus of the present invention, and FIG. 2 is a perspective view thereof.

Figure 12:
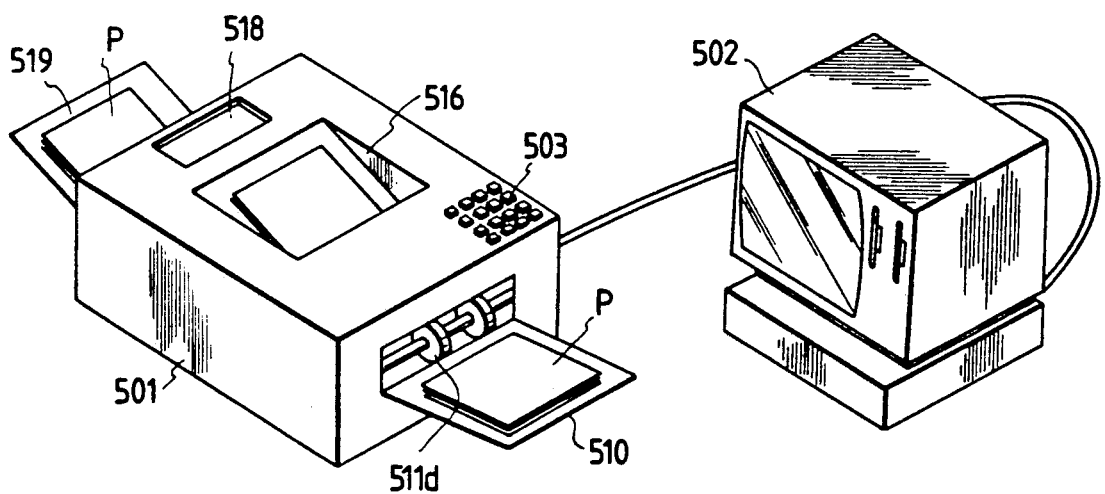

As shown in FIG. 12, the apparatus of the present embodiment is composed of a photographing unit 501 for recording the original P bearing code information, a control unit 502 for controlling said photographing unit 501, and a key input unit 503 serving as input means for entering index data.

In front of the photographing unit 501 there is provided, as shown in FIG. 11, a sheet feeding unit 510 for stacking the original documents P such as business forms, and a sensor S1 for detecting the presence or absence of the original documents P is provided thereunder.

Next to the tray 510, there is provided transporting means 511, composed of a belt 511c provided between rollers 511a, 511b and a roller 511d maintained in contact with said belt 511c and the position of said roller 511a, for transporting the original documents P one by one from the bottom, in a direction A. Above said transporting means 511 there is provided a bar code scanner 112 as reading means for reading the bar code attached on the original document P, and a sensor S2 for dectecting the presence or absence of the original document P on the belt 511c is provided between the rollers 511a and 511b. At the downstream side in the transporting direction on the transporting means 11, there is provided a guide plate 513 vertically rotatable by a rejecting soleniod 514, for sorting the original documents P to above or below. By the rotation of said guide plate 513, the original document P transported in the direction A is guided either to transport means 515 provided at approximately the same level as that of the transport means 511, or to a reject tray 516 provided above said transport means 515.

Said transport means 515 is composed of a pair of rollers 515a, 515b and a belt 515c provided therebetween. Between the reject tray 516 and the guide plate 513 there are provided rollers 517a, 517b for advancing the original P into said tray. Above the transport means 515 there is provided a replaceable camera 518 constituting means for photographing the original P, at a photographing position 518a on the belt 515c, on a microfilm (not shown).

In the downstream side in the transporting direction of the transport means 515, there is provided a sheet stacker 519 for stacking the originals P after photographing. The key input unit 503 shown in FIG. 12 is provided with a sheet feeding start switch for initiating the function of the apparatus.

In the following there will be explained the function of the bar code scanner 512, with reference to FIG. 14. A scanner unit 521 optically reads the bar code attached to the original P, and generates an electrical signal corresponding to the optical input. Said electrical signal is amplified by an amplifier 523 in a decorder unit 522, and is binary digitized by a comparator 524. Then said digital signal is subjected to the measurement of duration of the "0" and "1" levels by the digitizer 525. Then a demodulator 526 detects the start or stop character from the digitized data, and demodulates the bar code, utilizing said character as the basic module. The demodulator 526 detects the presence of the bar code, by releasing the code if an entire code can be demodulated, or, in a case a part of the code can be demodulated, a particular code indicating "partial demodulation" (namely a failed reading signal, used as data for specifying the partially demodulated code information). On the other hand, in case the bar code cannot be demodulated at all, for example in case the original document P is inverted, the demodulator 526 releases a particular code indicating the absence of the bar code. Thus, the demodulator 526 serves as detection means for detecting the presence or absence of the bar code. These codes are stored in a memory M of a control circuit 531 shown in FIG. 13.

Figure 13:
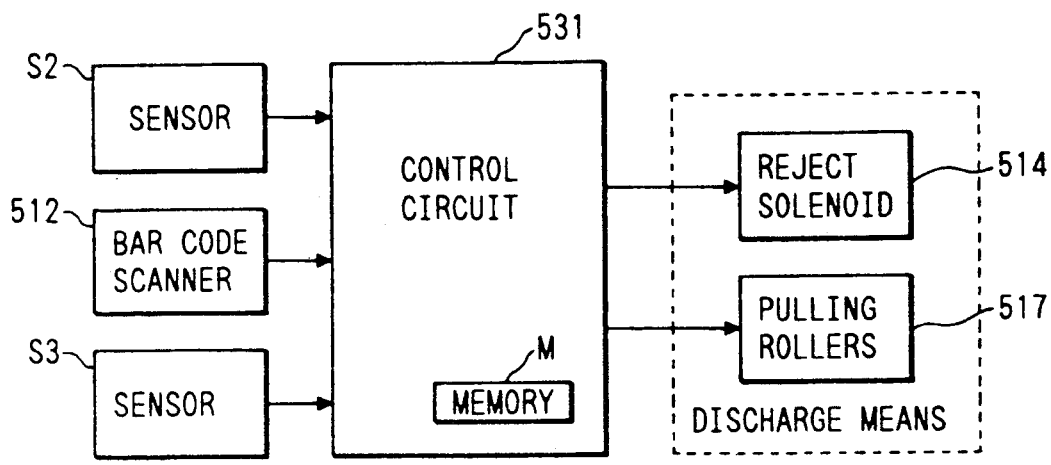
FIGS. 13 and 14 are block diagrams of the control system of the embodiment shown in FIG. 11.
Figure 14:
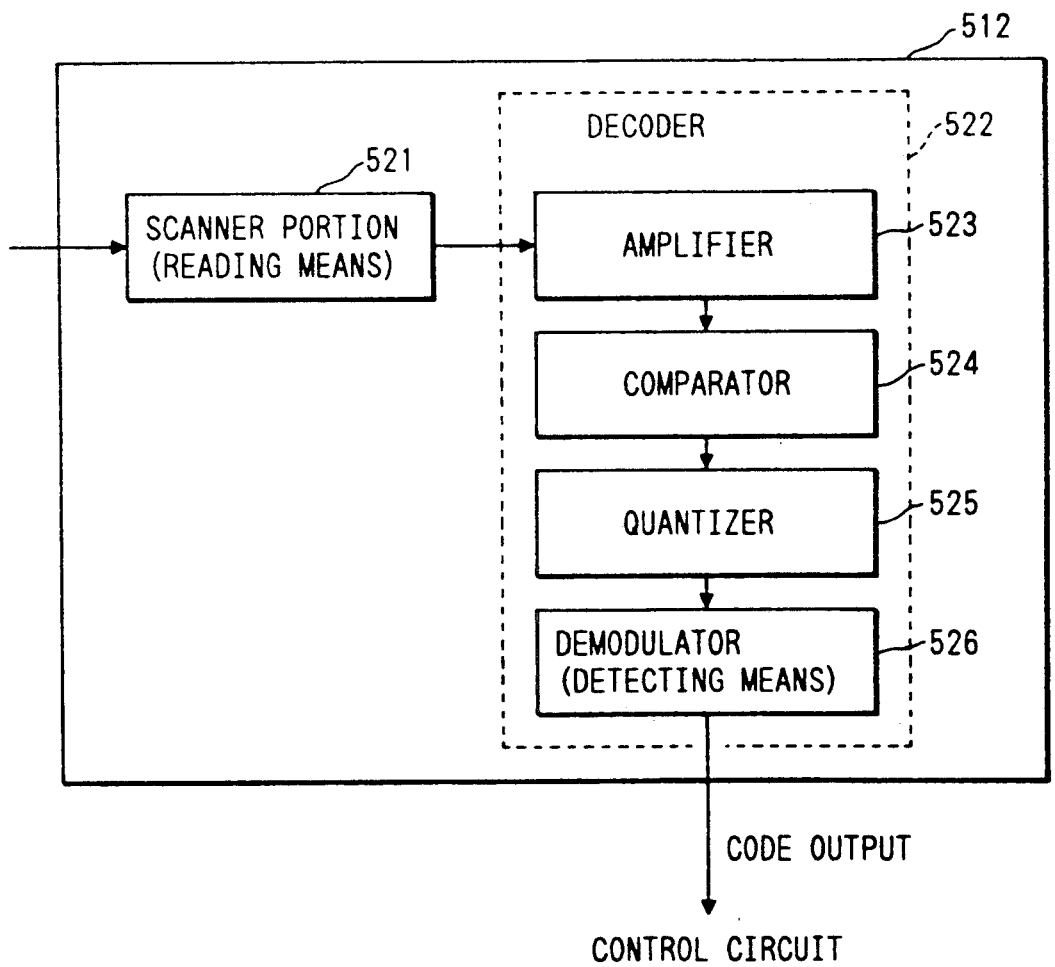

FIG. 13 is a block diagram of the control system of the present embodiment. The sensor S2, bar code scanner 512 serving as the reading means and detection means, sensor S3, reject solenoid 514 and rollers 517a, 517b constituting discharge means etc. are connected to a control circuit (for example CPU) 531 of the control unit 502.

Figure 15B:
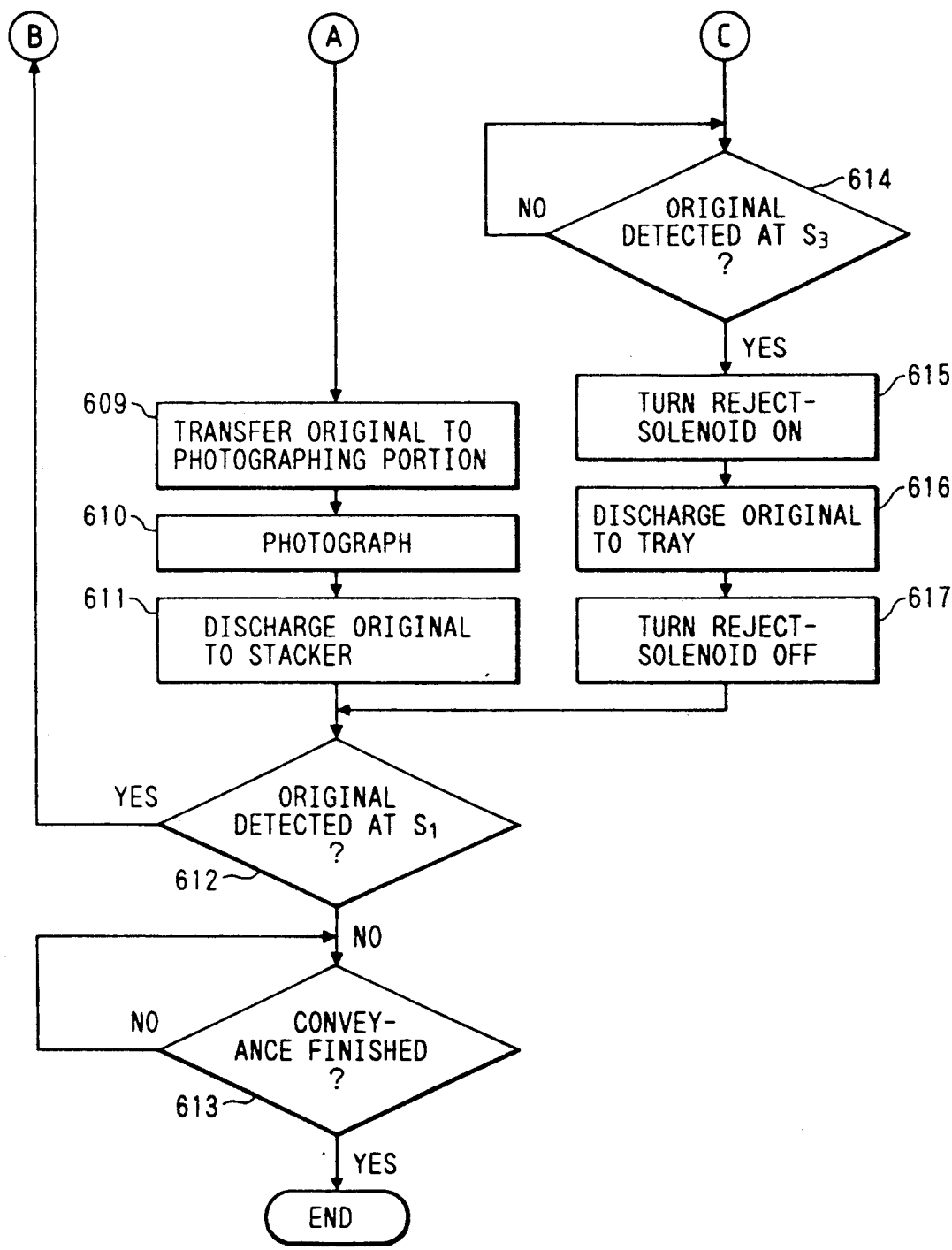
FIG. 15 is a flow chart of the control sequence of the embodiment shown in FIG. 13.

In the following there will be explained the function of the present embodiment, with reference to a flow chart shown in FIG. 15.

At first the original documents P are stacked on the feeding unit 510, and the start switch of the key input unit 503 is actuated (step 601), whereby an unrepresented motor is activated to feed the original documents P one by one at a constant interval (step 602).

When the original document P reaches the position of the sensor S2 (step 603), the control circuit 531 sends a scan start signal to the bar code scanner 512, thereby initiating the scanning operation (step 604). Depending on the result of reading, the bar code scanner 512 supplies the control circuit 531 with a code representing "a complete code" or "partially read" (both indicating the presence of a bar code), or "absence of bar code". If a bar code is present (step 605), the control circuit 531 stores the code, corresponding to the original, as index data (steps 607, 608). Subsequently the original P is advanced to the photographing unit 518a spaced by a predetermined distance from the sensor S4 (step 609), then photographed by the camera 518 in said photographing unit 518a (step 610), and discharged to the stacker 519 (step 611).

Subsequently, the control circuit 531 discriminates the presence or absence of the original P by the sensor S1 (step 612), and, when all the originals P are exhausted, stops the motor upon completion of the transportation of the last original P (step 613), thereby terminating the control sequence.

On the other hand, if the step 605 identifies the absence of a bar code, for example due to the inverted position of the original P, when the original P reaches the position of the sensor S3 (step 614), the control circuit 531 rotates the guide plate 513 by the reject solenoid 514 (step 615), thereby discharging the original P onto the reject tray 516 by the rollers 517a, 517b (step 616). Then, the reject solenoid 514 is deactivated (step 617), and the sequence proceeds to the step 612.

In the above-explained sequence, even the originals with failed bar code reading are subjected to the image recording operation without rejection as long as they bear bar codes, so that the sequence of the originals is not mixed up in the recording operation. Also since such originals are given indexes by the failed reading signal, the code information that could not be read can be specified, and the retrieval at the index correction can be facilitated. Also since only the originals lacking the bar code are rejected, it is easy to find, for example, the erroneously inverted originals.

In the following there will be explained other methods for detecting the presence or absence of the code information, with reference to FIGS. 16 to 18.

Figure 16:
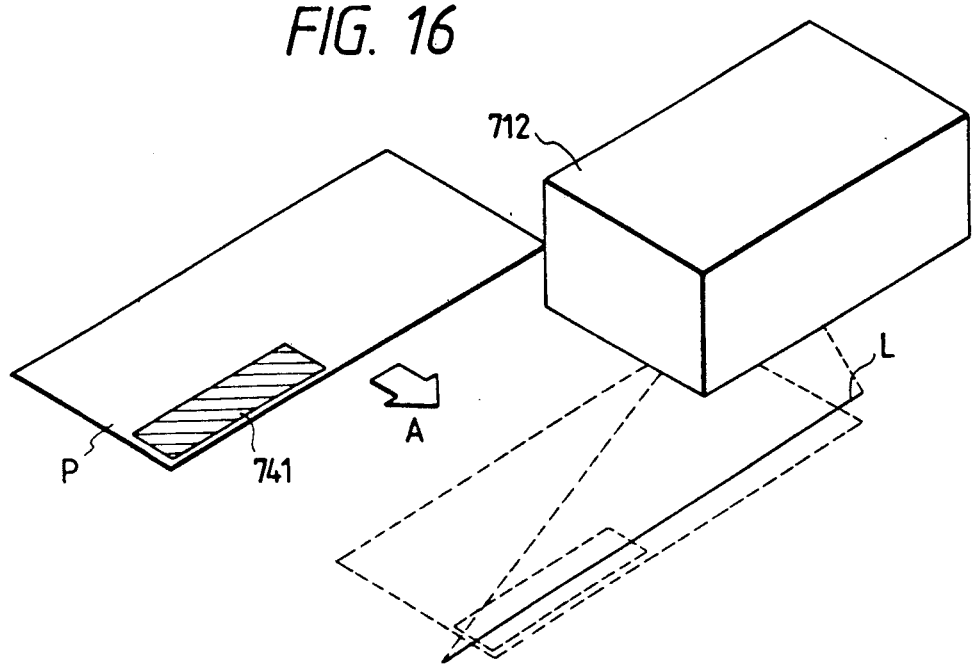
FIGS. 16, 17, 18A and 18B are views showing other methods of detecting presence or absence of code information.
Figure 17:
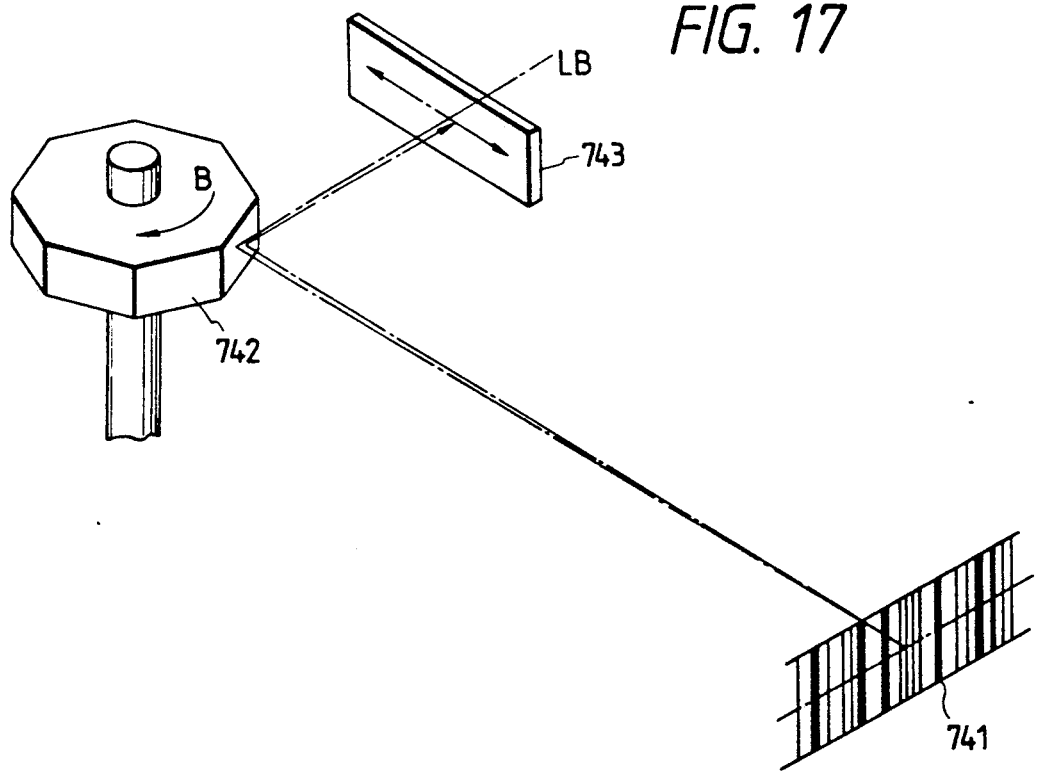

In FIG. 16, a bar code scanner 712 emits a laser beam along a scanning line L. When the bar code 741 passes through said scanning line L, the reflected light is received for example by a CCD and converted into an electrical signal. The scanning motion of the laser beam along the scanning line L is conducted, as shown in FIG. 17, by the rotation of a polygon mirror 742 in a direction B, and the reflected light of the laser beam LB enters a CCD 743.

In such a scanner system, the presence of a bar code is identified when the signal of the CCD 743 shows variations in excess of a predetermined number within a certain period, namely when lines in excess of a predetermined number are present within a given area (for example hatched area in FIG. 16). If the bar code cannot be read, a failed reading signal (used for index preparation) is supplied to the control circuit 531. If the bar code can be read, the corresponding code information is supplied to said control circuit 531.

Figure 18B:
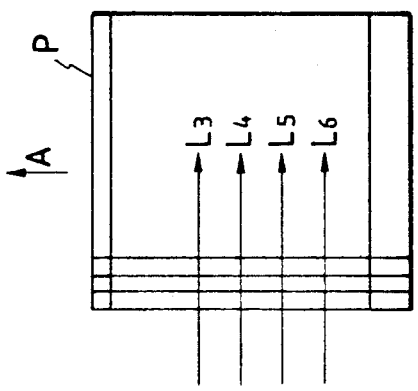
Figure 18A:
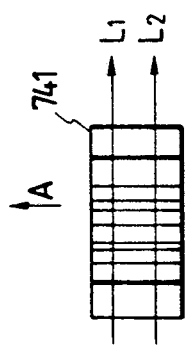

The bar code detection may also be conducted by plural scans as shown in FIG. 18. For example, the presence of a bar code is detected in case common code lines are detected, for example, on the scanning lines L1 and L2. In case the same lines are detected for a certain number of scans, the pattern is identified as not a bar code, in consideration of the height thereof. More specifically, in FIG. 18A, the lines of a code are detected only on the scan lines L1 and L2. On the other hand, in the case of FIG. 18B, the pattern is not identified as a bar code, as the lines are detected on four scanning lines L3-L6. This method allows further precise bar code detection.

The above-explained embodiment allows recording of the originals bearing code information in the original sequence, without rejection of the failed reading originals, so that there is no skipping in the index code information and the retrieval operation can be facilitated.

Also, since the failed reading signal is given only to the originals bearing the code information, the originals lacking the code information are not subjected to the index correction, so that the index correcting operation can be made efficiently and promptly.

Also, since only the originals lacking the code information are rejected, a search for such originals can be facilitated. This is particularly effective in case the confirmation by image is difficult, for example when the original is inverted.

Also, the code detection based on the number of scanning lines enables secure detection even in the presence of a smear or the like.

What is claimed is:

1. An image recording apparatus for recording on a recording medium an image of an original provided with identifying information, comprising:
   reading means for reading the identifying information of the original;
   recording means for recording an image of the original on the recording medium;
   transporting means for transporting the original to said reading means and said recording means;
   detecting means for detecting whether the original is provided with the identifying information or not; and
   control means for selecting whether recording of the original is effected or not according to a content of the detecting by said detecting means and a content of the reading by said reading means.

2. An apparatus according to claim 1, wherein said detecting means is adapted to detect the presence or absence of said identifying information, based on the output of said reading means.

3. An apparatus according to claim 1, wherein said control means causes the original of which identifying information is properly read by said reading means to be recorded on the recording medium, but the original of which identifying information is not properly read to be not recorded on said recording medium.

4. An apparatus according to claim 3, wherein said transporting means comprises switch means for selecting either a first path for transporting the original to the recording means or a second path not transporting the original to the recording means, and wherein said control means is adapted to control said switch means so as to selectively transport the original to said first or second path according to the content of the reading of said reading means and the content of the detecting by said detecting means.

5. An apparatus according to claim 4, wherein said control means causes the original of which identifying information cannot be properly read by said reading means but in which the presence of the identifying information is detected by said detecting to be transported to said second path.

6. An apparatus according to claim 4, wherein said control means causes the original of which absence of the identifying information is detected by said detecting means to be transported to said first path.

7. An apparatus according to claim 1, further comprising:
   mark recording means for recording a mark on the recording medium; and
   means for controlling said mark recording means according to the content of the detecting means.

8. An apparatus according to claim 7, wherein said mark recording means is adapted to record different marks on the recording medium, according to the content of the detecting means.

9. An apparatus according to claim 1, wherein said identifying information is code information, and said reading means is adapted to release a failed reading signal when said code information of the original cannot be properly read.

10. An apparatus according to claim 9, further comprising memory for storing the identifying information read by said reading means and an address corresponding to the image recorded on the recording medium.

11. An apparatus according to claim 10, wherein said memory means stores an address of an original whose identifying information has been correctly read by said reading means and an address of an original whose identifying information has not been correctly read by said reading means.

12. An apparatus according to claim 1, wherein said identifying information comprises a bar code, and wherein said detecting means detects whether the bar code either exists or not by processing signal corresponding to the respective bars of the bar code.

13. An apparatus according to claim 1, wherein said identifying information includes a bar code, and wherein said detecting means detects the presence of the bar code only when the number of the code is greater than a predetermined value.

14. An apparatus according to claim 12, wherein said reading means comprises a bar code scanner.

15. An apparatus according to claim 9, further comprising input means for entering the identifying information.

16. An apparatus according to claim 158 wherein said input means comprises a reader for reading the identifying information by manual scanning.

17. An apparatus according to claim 15, wherein said input means comprises a keyboard.

18. An information processing apparatus comprising:
   reading means for reading an identifying information provided on an original for identifying the original;
   recording means for recording the original on a recording medium;
   detecting means for detecting the presence or absence of said identifying information, on the basis of an output of said reading means;
   signal generating means for generating a code signal corresponding to said identifying information according to the output of said reading means;
   control means for controlling whether the recording means effects recording of said original or not according to a content of the detecting by said detecting means and a content of the reading by said reading means; and
   memory means for storing a code signal generated by said signal generating means and a position of an image recorded on the recording medium.

19. An apparatus according to claim 18, wherein said signal generating means is adapted to generate a first code signal or a second code signal respectively when the identifying information is correct or not.

20. An apparatus according to claim 19, wherein said control means causes the original to be not recorded when the presence of the identifying information is detected by said detecting means and the signal generating means generates said second code signal, and causes the original to be recorded when the presence of the identifying information is not detected or in case said first code signal is generated.

21. An apparatus according to claim 19, wherein said control means causes the original to be not recorded when the presence of the identifying information is not detected by said detecting means, but causes the original to be recorded when the identifying information is detected.

22. An apparatus according to claim 18, further comprising means for discriminating an original whose recording has been effected by the recording means and an original whose recording has not been effected.

23. An apparatus according to claim 22, wherein said discriminating means includes switch-over means for switching over between a first path and a second path so that the original may be passed through either one of said switch-over means effecting switching according to the content of detection of the detecting means and the content of reading of the reading means.

24. An apparatus according to claim 18, wherein the identifying information comprises a digital code.

25. An apparatus according to claim 24, wherein the digital code comprises a bar code.

* * * * *

UNITED STATES PATENT AND TRADEMARK OFFICE
CERTIFICATE OF CORRECTION

PATENT NO. : 5,126,540
DATED : June 30, 1992
INVENTOR(S) : KASHIWAGI, ET AL.

It is certified that error appears in the above-identified patent and that said Letters Patent is hereby corrected as shown below:

COLUMN 4

Line 10, "under," should read --under.--;
Line 19, "$S_2$for" should read --$S_2$ for--.

COLUMN 8

Line 1, "belt 14 c," should read --belt 14c,--.

COLUMN 9

Line 3, "illustrates" should read --illustrate--.

COLUMN 10

Line 33, "Consequently" should read --Consequently,--.

COLUMN 14

Line 35, "detecting" should read --detecting means--;
Line 46, "detecting means." should read --detecting of said detecting means.--;
Line 50, "detecting means." should read --detecting of said detecting means.--; and
Line 57, "memory" should read --memory means--.

UNITED STATES PATENT AND TRADEMARK OFFICE
CERTIFICATE OF CORRECTION

PATENT NO. : 5,126,540

DATED : June 30, 1992

INVENTOR(S) : KASHIWAGI, ET AL.

It is certified that error appears in the above-identified patent and that said Letters Patent is hereby corrected as shown below:

COLUMN 15

```
Line 1, "signal" should read --signals--;
Line 14, "claim 158" should read --claim 15,--.
```

Signed and Sealed this

Twenty-fourth Day of August, 1993

Attest:

BRUCE LEHMAN

Attesting Officer    Commissioner of Patents and Trademarks